March 3, 1942. D. A. BELDEN 2,275,280
HANDLE FOR COOKING UTENSILS
Filed May 31, 1939
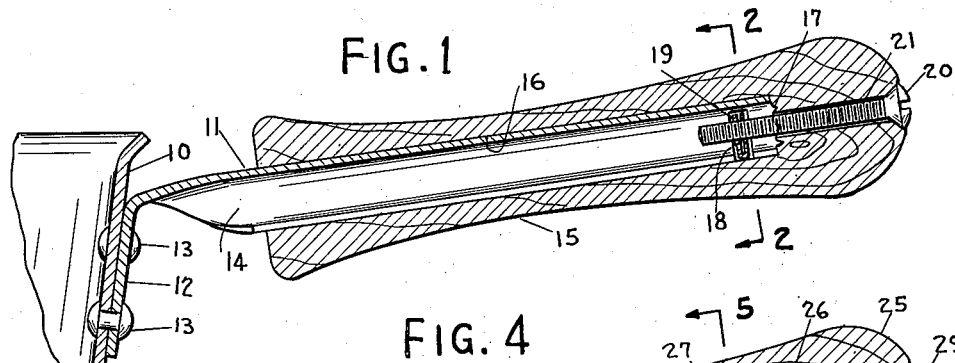
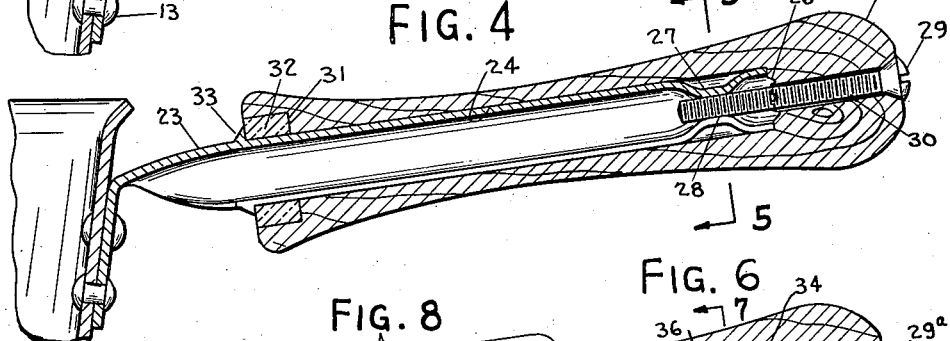
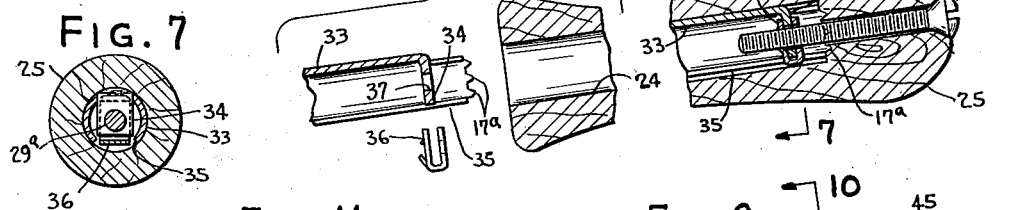
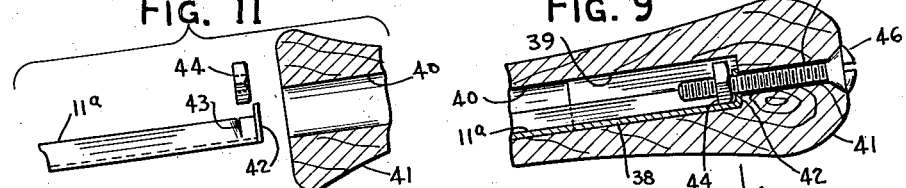
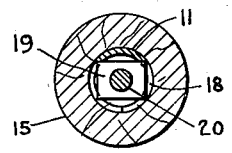
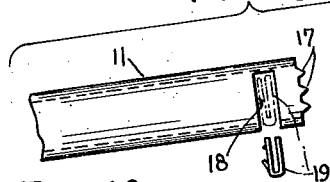
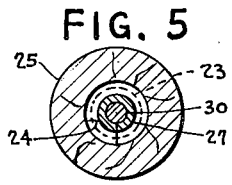
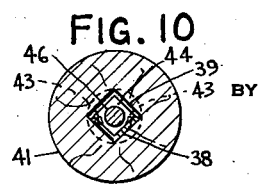
INVENTOR
DON A. BELDEN
BY
*J. Ralph Barrow*
ATTORNEY Patented Mar. 3, 1942

2,275,280

UNITED STATES PATENT OFFICE 2,275,280

HANDLE FOR COOKING UTENSILS

Don A. Belden, Akron, Ohio

Application May 31, 1939, Serial No. 276,539

8 Claims. (Cl. 16—116)

This invention relates to handles for cooking utensils.

Heretofore, in the use of cooking utensils, such as pans or pots of the type having outwardly extending gripping handles of wood or the like thereon, the difficulty has been experienced that the wooden hand grips become charred at the end adjacent the utensil either by the direct action of the heating medium or by heat conducted through the handle support or holder, so that the hand grip usually becomes loose on its holder. This was undesirable because the utensil, when lifted by the hand grip, could then turn relative to the latter, resulting in frequent spilling of the contents of the utensil.

Furthermore, in the manufacture of enameled utensils of the type described, it has been the practice to enamel the utensils after all metal parts have been joined together, as by means of rivets or by welding, because pressure applied after enameling tends to crack the enamel coating. When the enameling is performed by a dipping process, the metal handle support or holder usually also becomes coated with enamel, and it is difficult or impractical to attach the handle to the pan or pot in the usual ways because of the likelihood of cracking the enamel.

An object of this invention is to provide a handle construction of the character described in which the hand grip will remain firmly and non-rotatably secured on its holder even though a considerable portion thereof adjacent the utensil may become destroyed by charring.

Another object of the invention is to provide a handle construction of the character described in which the holder or support for the handle is substantially air-cooled.

Another object of the invention is to provide in a handle construction of the character described improved means for firmly securing the handle grip to its holder or support by a bolt without threading said holder to receive the bolt.

Still another object of the invention is to provide a simple, economical handle construction of the character described which is easily assembled on the cooking utensil.

These and other objects will be manifest from the following brief description and the accompanying drawing.

Of the accompanying drawing:

Figure 1 is a longitudinal cross-section, partly broken away, of an improved handle construction embodying the invention mounted on a cooking utensil.

Figure 2 is a cross-section taken on line 2—2 of Figure 1.

Figure 3 is an explosion view of parts shown in Figure 1, illustrating the method of assembling the same.

Figure 4 is a view similar to Figure 1 of a modified form of handle construction.

Figure 5 is a cross-section taken on line 5—5 of Figure 4.

Figure 6 is a fragmentary cross-section illustrating another type of fastening means for a utensil hand grip.

Figure 7 is a cross-section taken on line 7—7 of Figure 6.

Figure 8 is an explosion view similar to Figure 3 of the parts shown in Figure 6.

Figure 9 is a view similar to Figure 6 of another type of hand grip fastening means.

Figure 10 is a cross-section on line 10—10 of Figure 9.

Figure 11 is an explosion view similar to Figure 3 of the parts shown in Figure 9.

Referring to Figures 1, 2, and 3 of the drawing, the numeral 10 designates a cooking utensil, such as a pan or pot, having attached thereto an outwardly extending handle support or holder 11. Support 11 may be a hollow metal tube flared at its inner end to provide an angularly extending flange 12 for securing the support to the utensil, as by means of rivets 13. This tubular support 11 is provided with an opening 14 at its inner end, substantially as shown, to permit circulation of air within the tube to cool the handle.

A hand grip 15, of wood or similar heat-insulating material, may be provided with a longitudinally extending bore 16 therein for receiving tubular support 11, the end of the latter preferably being provided with pointed spurs or projections 17, 17, which become embedded in the wooden hand grip at the end of bore 16 when the grip is clamped on, for preventing rotation of the grip relative to the support. Handle grips of plastic material may be formed with grooves therein to receive the spurs or projections.

A circumferentially extending slot 18 may be provided in tube 11 relatively snugly to receive a suitable nut 18, which is prevented from having substantial endwise play or from turning by engagement thereof with the edges of the slot. Engagement of the nut with the wall of bore 16 may further prevent nut 18 from turning. Nut 19 preferably is a spring nut and is adapted to receive a bolt 20 inserted through an opening 21 in the end of grip 15. With this spring type of nut the threaded end of bolt need only be pushed through the opening in the nut, without the necessity of turning the bolt, until the grip 15 is in tight non-rotatable abutment with the end of tube 11, the self-locking action of the spring-nut preventing retraction of the bolt unless the latter is unscrewed.

The method of assembling the parts of the handle is best shown in Figure 3. Nut 19 is readily held in slot 18 of support 11 (see chain dotted position of nut) while grip 15 is slipped over the end thereof, after which it is a simple operation to clamp the handle against the end of support 11 by means of bolt 20, as described above.

With this type of fastening means the necessity of threading a portion of support 11 is obviated, this being particularly desirable when the metal parts of the utensil have been previously coated with enamel or like substance to make threading operations impractical or difficult. Furthermore, since the grip 15 is non-rotatably secured at a point remote from the utensil 10 the securing means is not affected by charring of the grip 15 at the end adjacent the utensil, so that a substantial portion of the grip may become completely destroyed by charring but the remaining portion of the grip will be securely and non-rotatably retained on the support 11.

In Figures 4 and 5 is shown a modified form of handle construction in which a tubular support or holder 23, similar to support 11 in Figure 1, may be received in a longitudinal bore 24 of a grip 25 of wood or the like. As before, the end of tube 23 may have spurs or projections 26 thereon to prevent relative rotation of the grip on its support. At the outer end, support 23 may be reduced or restricted at 27 and interiorly threaded at 28 for receiving the end of a bolt 29 extending through an opening 30 in the outer end of grip 25 to dispense with the use of a separate nut.

Grip 25 or the other grips disclosed herein may have a bore 31 at the inner ends thereof for receiving a plug 32 of incombustible heat-insulating material, such as porcelain or the like, plug 32 being formed with an opening 33 for receiving support 23 therethrough. An annular shoulder portion 33 may be provided on support 23, against which plug 32 abuts. Plug 32 insulates the inner end of handle 25 against heat conducted along the handle support 23, and materially reduces charring of the inner end of the grip. It is to be understood that a similar insulating plug may be used in combination with the handle construction shown in Figure 1, or with modified structures subsequently to be described.

The handle construction shown in Figures 6, 7 and 8 is different from that shown in Figure 1 only in the manner of retaining the spring-nut 19 in support 33. For this purpose, a portion of support 33 adjacent the outer end thereof may be turned inwardly to provide a lug 34. As best shown in Figure 7, tubular support 33 preferably is formed with an opening or slot 35 opposite lug 34 to permit insertion of a U-shaped spring nut 36 over the lug, as shown in Figure 6. Lug 34 is provided with an orifice 37 for cooperating with the thread-engaging openings of the nut 36.

The last described arrangement is such that in assembling the handle parts (see Figure 8) nut 36 may be clipped over lug 34, after which grip 25 may be readily applied over support 33 and clamped in abutment with the end thereof by means of a bolt 29ª extending through the end of the grip, this bolt being engageable with nut 36 in the manner described in connection with Figure 1. Spurs 17ª on the end of support 33 become embedded in the grip to lock the latter against relative rotation on the support.

The handle construction illustrated in Figures 9, 10 and 11 may be substantially similar to the structures previously described except for the means for non-rotatably connecting the handle grip on the outer end of the support or holder 11ª. For this purpose the outer end of holder 11ª may be squared or V-shaped at 38 to fit snugly in a squared socket 39 in the inner end of the bore 40 in grip 41.

For clamping the grip 41 on holder 11ª, a portion at the end of the latter may be flanged inwardly in a suitable manner to form a lug 42, and the side edges of the V-shaped portion 39 may be notched or cut to form inwardly extending projections 43, so that a nut 44 will be retained against endwise movement between lug 42 and projections 43. Lug 42 is provided with an orifice 45 for receiving the end of a bolt 46 extended through the end of grip 41 to engage nut 44, the latter being held against turning when the bolt is turned by reason of sides of the nut engaging the flat sides of V-shaped portion 39 of holder 11ª. It is seen that this also provides simple handle construction which is easily assembled in the manner illustrated in Figures 9 and 11, and in which the clamping and locking means are remote from the utensil.

Thus has been provided improved handle constructions for cooking or like utensils of the type described, in which there is a particular advantage that the means for fastening the handle grip and locking it against rotation on its support is remote from the utensil, so that such means is not affected by the usual charring or burning of the handle at the end adjacent said utensil. These constructions, in addition to being efficient and inexpensive to manufacture, are adapted to be rapidly assembled on the utensil and without impairing enameled surfaces thereof, thereby greatly minimizing production costs.

Modifications of the invention may be resorted to without departing from the spirit thereof or the scope of the appended claims.

What is claimed is:

1. A handle for cooking utensils, comprising a longitudinal holder for attachment at one end to a utensil, a grip having a longitudinal bore extending from one end for receiving said holder and having a reduced opening at the other end thereof extending outwardly from said bore, said holder having an opening therein adjacent the other end thereof for receiving a nut, said nut being retained against endwise and rotational movement by engagement thereof with the edges of said opening, a bolt extending through said reduced opening in said grip for engagement with said nut to clamp said grip on said holder, and means at said other end of said holder to prevent relative rotation of said handle thereon.

2. A handle for cooking utensils comprising a longitudinal hollow holder means at one end of said holder for attaching it to a utensil, a lug extending from the wall of said holder adjacent the other end thereof, said lug having an aperture therein, a U-shaped nut for engagement over said lug in cooperation with said aperture, a grip having a bore therein for receiving said holder from one end and having a reduced opening at the other end thereof extending outwardly from said bore, a bolt extending through said reduced opening and engaging said nut for clamping said grip in abutment with said other end of said holder, and means at said other end of said holder to prevent relative rotation of said grip thereon.

3. A handle for cooking utensils comprising a longitudinal holder, said holder being adapted to be attached at one end thereof to a utensil, a lug adjacent the other end of said holder having a central aperture therein, a U-shaped nut for engagement over said lug in cooperation with said aperture, a grip having a bore therein from one end for receiving said holder and having a reduced opening at the other end thereof extending outwardly from said bore, a bolt extending through said reduced opening in said grip and engaging said nut for clamping the grip in abutment with said other end of said holder, and means at the said other end of said holder to prevent relative rotation of said grip thereon.

4. A handle for cooking utensils comprising a hollow longitudinal holder for attachment at one end thereof to a utensil, a lug extending radially inwardly adjacent the other end of said holder, said lug having a central aperture therein, a U-shaped nut for engagement over said lug in cooperation with said aperture, a grip having a bore therein for receiving said holder and having a reduced opening extending outwardly from said bore, a bolt extending through said reduced opening and engaging said nut for clamping said grip in abutment with said other end of said holder, and means at said other end of said holder to prevent relative rotation of said grip thereon, said holder having an opening therein opposite said lug to permit application of said nut over said lug.

5. A handle for cooking utensils comprising a longitudinal tubular holder for attachment at one end thereof to a utensil, means for retaining a nut against endwise and rotational movement at the other end of said holder, a grip having a bore extending from one end thereof for receiving said holder and having a reduced opening extending outwardly from said bore at the other end of the grip, a bolt extending through said reduced opening for engaging said nut to secure said grip on said holder in abutment with the said other end thereof, and means adjacent said other end of said grip for locking said grip against relative rotational movement thereof on said holder.

6. A handle for cooking utensils comprising a longitudinal holder for attachment at one end to a utensil, a grip having a bore extending from one end thereof for receiving said holder, releasable interengaging means on said holder and on said grip adjacent the other end of the grip for clamping the grip in abutment with the other end of said holder, and projections on said other end of said holder, said clamping action thereby embedding said projections in said grip to prevent relative rotational movement thereof on said holder.

7. A handle for cooking utensils comprising a longitudinal holder adapted to be attached at one end to a utensil, a grip having a longitudinal bore therein extending from one end to adjacent the other end for receiving said holder, and said grip having a reduced opening at said other end communicating with the bore, a threaded part relatively fixed on said holder adjacent the other end thereof, an element received through said opening and threadedly engaging said threaded part releasably to clamp said grip in abutment with said other end of the holder, and means at said other end of said holder held in engagement with said grip by the clamping action of said element to prevent relative rotation of the grip on the holder.

8. A handle for cooking utensils comprising a longitudinal hollow holder for attachment at one end to a utensil, a grip having a bore therein from one end for receiving said holder and having a reduced opening at the other end thereof extending from said bore, the wall of said hollow holder adjacent the other end thereof having a reduced portion and being internally threaded at said reduced portion, a bolt extending through said reduced opening in said grip for engagement with said threaded portion to clamp said handle in abutment with said other end of said holder, and means at said other end of said holder to prevent relative rotation of said grip thereon.

DON A. BELDEN.